United States Patent
Imada et al.

(10) Patent No.: US 9,697,024 B2
(45) Date of Patent: *Jul. 4, 2017

(54) INTERRUPT MANAGEMENT METHOD, AND COMPUTER IMPLEMENTING THE INTERRUPT MANAGEMENT METHOD

(71) Applicant: Hitachi, Ltd., Tokyo (JP)

(72) Inventors: Takayuki Imada, Tokyo (JP); Toshiomi Moriki, Tokyo (JP); Naoya Hattori, Tokyo (JP)

(73) Assignee: HITACHI, LTD., Tokyo (JP)

( * ) Notice: Subject to any disclaimer, the term of this patent is extended or adjusted under 35 U.S.C. 154(b) by 547 days.

This patent is subject to a terminal disclaimer.

(21) Appl. No.: 14/275,183

(22) Filed: May 12, 2014

(65) Prior Publication Data

US 2015/0026678 A1    Jan. 22, 2015

(30) Foreign Application Priority Data

Jul. 19, 2013 (JP) .................. 2013-150629

(51) Int. Cl.
*G06F 13/24* (2006.01)
*G06F 9/455* (2006.01)

(52) U.S. Cl.
CPC .................. *G06F 9/45533* (2013.01)

(58) Field of Classification Search
CPC .... G06F 13/24; G06F 9/45558; G06F 9/4406; G06F 2009/45575; G06F 9/45533; Y02B 60/1228
See application file for complete search history.

(56) References Cited

U.S. PATENT DOCUMENTS

| | | | |
|---|---|---|---|
| 7,685,635 B2 * | 3/2010 | Vega ..................... | G06F 9/4843 718/1 |
| 7,900,204 B2 * | 3/2011 | Bennett ............... | G06F 9/45558 712/244 |

(Continued)

OTHER PUBLICATIONS

"Intel Virtualization Technology" by Uhlig et al. IEEE 0018-9162/05, 2005.*

(Continued)

*Primary Examiner* — Jing-Yih Shyu
(74) *Attorney, Agent, or Firm* — Volpe and Koenig, P.C.

(57) ABSTRACT

A first processor group of physical processors having hardware-assisted virtualization set disabled among the plurality of physical processors; a second processor group of physical processors having the hardware-assisted virtualization set enabled among the plurality of physical processors; a first OS to which the first processor group is allocated; and a virtualization part to which the second processor group is allocated, the virtualization part is configured to: allocate a predetermined area within the memory and a predetermined one of the plurality of physical processors within the second processor group to the second OS as the virtualized processor, and boot the second OS to be provided as the virtual machine; and set a shared area, which is readable/writable by both the first OS and the virtualization part, and set interrupt routing information comprising a correspondence relationship between a logical interrupt to the second OS and a physical interrupt thereto.

13 Claims, 7 Drawing Sheets

(56) References Cited

U.S. PATENT DOCUMENTS

| | | | |
|---|---|---|---|
| 2008/0066143 A1* | 3/2008 | Charles Tai | G06F 8/61 |
| | | | 726/1 |
| 2008/0155092 A1* | 6/2008 | Kumar | G06F 11/348 |
| | | | 709/224 |
| 2010/0223611 A1 | 9/2010 | Mahalingam et al. | |
| 2011/0161541 A1 | 6/2011 | Madukkarumukumana et al. | |
| 2015/0067229 A1* | 3/2015 | Connor | G06F 13/4022 |
| | | | 710/317 |

OTHER PUBLICATIONS

"Intel 64 and IA-32 Architectures Software Developer's Manual", vol. 3C: System Programming Guide, Part 3, Intel Corp, Issued Jun. 2013, pp. 29-1, 29-13, 29-14.

\* cited by examiner

Fig. 1

| GUEST PARTITION NUMBER 210 | VIRTUALIZED CPU LAPIC ID 220 | PHYSICAL CPU CORE LAPIC ID 230 |
| --- | --- | --- |
| 0 | 0 | 1 |
|   | 1 | 2 |
|   | 2 | 3 |
|   | 3 | 4 |
| 1 | 0 | 5 |
|   | 1 | 6 |

141
VIRTUAL TO PHYSICAL CPU MAPPING TABLE

INTERRUPT MANAGEMENT METHOD, AND COMPUTER IMPLEMENTING THE INTERRUPT MANAGEMENT METHOD

CLAIM OF PRIORITY

The present application claims priority from Japanese patent application JP 2013-150629 filed on Jul. 19, 2013, the content of which is hereby incorporated by reference into this application.

BACKGROUND

This invention relates to an interrupt management technology employed in a case where virtualization software is used for a computer including a multicore CPU or having a multiprocessor configuration.

In recent years, for a storage apparatus used in a company, importance is put on not only access performance of each storage apparatus but also cost performance such as low price, energy savings, and space savings. Up to now, an individual dedicated storage apparatus is provided depending on a kind of access interface (I/F) or a protocol. However, in recent years, a unified storage apparatus including access I/Fs of both a storage area network (SAN) and a local area network (LAN) has been emerging, and high cost performance thereof has been attracting attention.

In the unified storage apparatus, it is necessary to simultaneously operate both a block server operating system (OS) for processing a block access (HDD access method on a sector basis) from a storage area network interface (SAN I/F) within the same casing and a file server OS for processing a file access (data access method on a file basis) from a local area network interface (LAN I/F). For example, virtualization software is known as means for realizing simultaneous operations of a plurality of OSes on a single computer.

The virtualization software is a technology that has been used mainly for the server apparatus, and generates a plurality of logical partitions on a single computer. Individual OSes can be independently executed in the respective logical partitions, and hence the simultaneous operations thereof can be realized by generating two logical partitions within the unified storage apparatus, simultaneously operating the block server OS in one logical partition and the file server OS in the other logical partition, and coupling the two through a virtual communication channel.

A main role of the virtualization software is to manage correspondences between physical resources (processor, memory, and I/O device) of the computer and the logical partition. In order to manage the physical resources, the virtualization software constantly monitors a usage situation of a central processing unit (CPU) time in the logical partition, a communication situation involving an interrupt, and the like, and, when access is made to resources more than the resources allocated to a guest OS in the logical partition, suppresses the access or substitutes processing. Considerable deterioration in performance (overhead) occurs when the entire processing is performed by software, and hence a CPU manufactured by Intel Corporation in recent years has a function dedicated to hardware support of the management of the physical resources performed by the virtualization software, for example, a virtualization technology for Xeon (VT-x) disclosed in Intel 64 and IA-32 Architectures Software Developer's Manual Volume 3C: System Programming Guide, Part 3, Intel Corp, issued June 2013, pp. 29-13, 14 (hereinafter referred to as "Non patent Literature 1"). In the following description, the function of this kind is referred to as "hardware-assisted virtualization".

However, in the case of the storage apparatus, in particular, the block server OS receives access from a database server or the like, and is therefore demanded to have high responsiveness (low access latency) on the order of several tens of microseconds. Even for the unified storage apparatus, the customer that mainly uses the SAN tends to demand higher performance. In addition, also for the file server OS, it is conceivable that data processing request per unit time increases as progress is made in use and utilization of big data.

Therefore, when the virtualization software is applied to the storage apparatus, it is necessary to utilize the above-mentioned hardware-assisted virtualization to a maximum level and to minimize the overhead ascribable to virtualization as disclosed in, for example, US 2011/0161541 and US 2010/0223611. However, as a main cause of the overhead ascribable to the current virtualization software, there is a substitution of communication processing performed by an interrupt. In the case of using the virtualization software, when the interrupt is transmitted, the virtualization software undergoes three steps of (1) an occurrence of a physical interrupt, (2) reception of the physical interrupt, and (3) generation of a logical interrupt, and notifies an interrupt handler of the OS in the logical partition of the interrupt.

SUMMARY

However, in the above-mentioned related-art example, when an event (virtualization event), such as the interrupt, which needs to be processed by the virtualization software, occurs, a mode of the CPU is switched from a mode (VMX non-root) of executing the guest OS to a mode (VMX root) of executing processing by the virtualization software. This switching processing causes the overhead.

An object of this invention is to suppress an occurrence of a virtualization event on a computer or a storage apparatus including a multicore CPU or a plurality of CPUs and virtualization software, to thereby reduce the above-mentioned overhead and realize a high-speed interrupt to an OS under control of the virtualization software.

A representative aspect of this invention is as follows. A control method for a computer, the computer comprising: a plurality of physical processors comprising hardware-assisted virtualization; a memory; a first processor group of physical processors having hardware-assisted virtualization set disabled among the plurality of physical processors; and a second processor group of physical processors having the hardware-assisted virtualization set enabled among the plurality of physical processors, the control method comprising: a first step of allocating the first processor group to a first OS, and booting the first OS; a second step of allocating the second processor group to a virtualization part for operating a virtual machine, and activating the virtualization part; a third step of allocating, by the virtualization part, a predetermined area within the memory and a predetermined one of the plurality of physical processors within the second processor group to a second OS serving as the virtual machine, and booting the second OS; a fourth step of setting, by the virtualization part, a shared area, which is readable/writable by both the first OS and the virtualization part, in the memory; a fifth step of setting, by the virtualization part, interrupt routing information comprising a correspondence relationship between a logical interrupt to the second OS and a physical interrupt thereto, in the shared area; a sixth step of acquiring, by the first OS, the interrupt routing information from the shared area; a seventh step of controlling, by the first OS, a first physical processor within the first processor group to generate the physical interrupt based on the correspondence relationship between the logical interrupt to the second OS and the physical interrupt thereto, which is comprised in the interrupt routing information, and issuing, by the first physical processor, the physical interrupt to a second physical processor within the second processor group based on the interrupt routing information; and an eighth step of issuing, by the second physical processor, when receiving the physical interrupt from the first physical processor, the logical interrupt to the second OS based on the interrupt routing information.

Therefore, according to one embodiment of this invention, the processor including the hardware-assisted virtualization and the hardware-assisted interrupt virtualization can be used to realize high-speed interrupt transmission from the first OS out of control of the virtualization part (virtualization software, VMM) to the second OS (guest OS) under control of the virtualization part without the intermediation of the virtualization software and to increase the speed of interrupt processing.

DETAILED DESCRIPTION OF THE PREFERRED EMBODIMENT

Now, an embodiment of this invention is described with reference to the accompanying drawings.

Figure 1:
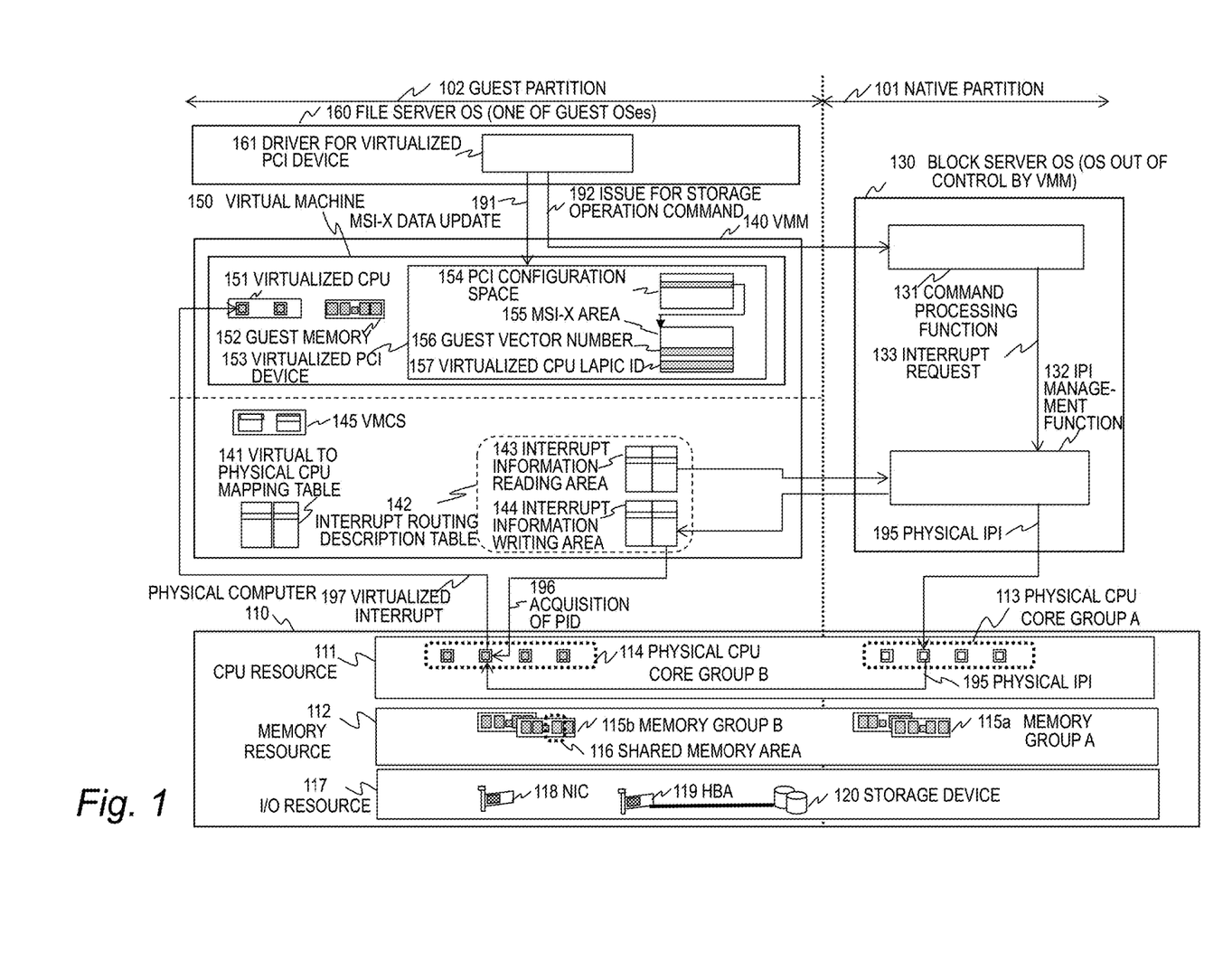
FIG. 1 shows an embodiment of this invention, and is a block diagram illustrating an example of a storage apparatus that unifies a file server function and a block server function on one piece of hardware including a multicore processor.

FIG. 1 illustrates an embodiment of this invention, and is a block diagram illustrating an example of a storage apparatus that unifies a file server function and a block server function on one piece of hardware including a multicore processor.

In this embodiment, a description is made of an example where a block server OS 130 and a file server OS 160 independently operate on the same hardware as an OS out of control of virtualization software and as a guest OS on the virtualization software, respectively, in order to build a unified storage apparatus, and the block server OS processes a storage operation command issued from the file server OS, after which the block server OS uses an interrupt to notify the file server OS of a command completion.

It should be noted that this embodiment is merely an example to which this invention is applied, and it should be understood that this invention can easily be applied in a similar manner to a case where the interrupt is caused from the OS out of control of the virtualization software to the guest OS.

1. HARDWARE CONFIGURATION

A hardware configuration example of the unified storage apparatus for carrying out this invention is described with reference to FIG. 1. A physical computer 110 includes, as hardware resources, a CPU resource 111, a memory resource 112, and an I/O resource 117 for performing communications and transmission/reception of data.

The CPU resource 111 is formed of a plurality of CPU cores by using a multiprocessor configuration or a multicore CPU. The CPU cores each include hardware-assisted virtualization (for example, VT-x function manufactured by Intel Corporation), and are classified into a physical CPU core group B 114 of cores having the hardware-assisted virtualization set enabled (VMX ON) and a physical CPU core group A 113 of cores having the hardware-assisted virtualization set disabled (VMX OFF).

Here, a physical CPU core of each of the CPU resources 111 has a distinction between an enabled mode (in the following description, virtualization ON mode) of the hardware-assisted virtualization and a disabled mode (virtualization OFF mode) thereof. In addition, in the virtualization ON mode, as disclosed in the above-mentioned Non patent Literature 1, hardware-assisted interrupt virtualization (in the above-mentioned Non patent Literature 1, the posted interrupt processing) of the hardware-assisted virtualization is enabled. In the embodiment, it is assumed below that the posted interrupt processing is used.

The memory resource 112 is formed of a memory group A 115a allocated to the block server OS 130 and a memory group B 115b allocated to a virtual machine monitor (VMM) 140 serving as the virtualization software. The memory group A 115a is accessed by the physical CPU core group A 113. The memory group B 115b is accessed by the physical CPU core group B 114, and a part of the memory group B 115b is further used by the file server OS 160. Further, a part of the memory area allocated to the VMM 140 within the memory group B 115b includes a shared memory area 116 that can be accessed directly by the block server OS 130.

The I/O resource 117 includes a network interface card (NIC) 118 for communicating to/from a computer (not shown) through a network (not shown), a storage device 120 for storing data and programs through a storage area network (SAN) (not shown), and a host bus adapter (HBA) 119 for performing transmission/reception of data. It should be noted that the NIC 118 and the HBA 119 are I/O devices compatible with the specifications of peripheral component interfaces (PCI).

2. SOFTWARE CONFIGURATION

Next, a main portion of a configuration of software executed on the physical computer 110 is described in detail with reference to FIG. 1.

On the physical computer 110, the block server OS 130 and the VMM 140 serving as the virtualization software independently operate as system software. It should be noted that the block server OS 130 is an OS for accessing an HDD or the like on a sector basis through the SAN or the like. Further, the file server OS 160 is an OS coupled to a LAN, for managing data on a file basis.

The block server OS 130 operates in a native partition 101 that can directly control the hardware of the physical computer 110, and the file server OS 160 operates in a guest partition 102 managed by the VMM 140.

The block server OS 130 includes a command processing function 131 for executing a storage operation command 192 and an inter processor interrupt (IPI) management function 132 for control an interrupt between physical CPU cores (or processor cores).

The command processing function 131 is an object for processing, by the block server OS 130, the storage operation command 192 sent from the file server OS 160. The command processing function 131 accesses the storage device 120 via the HBA 119 in accordance with the received storage operation command 192 and executes the received command. The command processing function 131 acquires an execution result obtained in response to the storage operation command 192, and then requests the IPI management function 132 for an interrupt request 133 for notifying the file server OS 160 of the command completion. It should be noted that, in this embodiment, the IPI is used because the interrupt is caused from one physical CPU core within the physical CPU core group A 113 for executing the block server OS 130 to one physical CPU core within the physical CPU core group B 114 for executing the VMM 140. It should be noted that, in the following description, the core belonging to the physical CPU core group A 113 is set as a physical CPU core A, and the core belonging to the physical CPU core group B 114 is set as a physical CPU core B.

The IPI management function 132 issues a physical IPI 195 to a virtualized CPU 151 allocated to the file server OS 160 to which the interrupt request 133 received from the command processing function 131 is to be transmitted. It should be noted that the command processing function 131 may be configured to have the function of the IPI management function 132.

The VMM 140 uses the physical resources allocated from the physical computer 110 to generate a virtual machine 150. A plurality of virtual machines 150 can be generated by the VMM 140, and all the virtual machines 150 belong to the guest partition 102. An execution state of the virtualized CPU 151 included in the virtual machine 150 is retained by a virtual machine control structure (VMCS) 145 serving as virtual machine state information retained by the VMM 140. It should be noted that details of the VMCS 145 are as described in the above-mentioned Non patent Literature 1.

The virtual machine 150 includes at least one virtualized CPU 151, a guest memory 152, and a virtualized PCI device 153 to be subjected to the interrupt, and may retain another device in accordance with another need.

As the virtualized CPU 151, at least one physical CPU core B within the physical CPU core group B 114 is allocated by the VMM 140. As the guest memory 152, a part of the memory group B 115b is allocated by the VMM 140, and the guest OS can handle the guest memory 152 as if the guest memory 152 were a physical memory on the virtual machine 150. The virtualized PCI device 153 is a virtual device that behaves like the HBA 119 implemented by software based on PCI specifications, and includes a PCI configuration space 154 based on the PCI specifications disclosed in PCI Local Bus Specification Revision 3.0 (issued by PCI SIG, Aug. 12, 2002) and a message signal interrupt-X (MSI-X) area 155.

The MSI-X area 155 retains a guest vector number 156 for notifying of an interrupt vector and a virtualized CPU local advanced programmable interrupt controller (LAPIC) ID 157, and may include other data based on the MSI-X specifications as necessary.

Further, the data retained by the virtualized PCI device 153 is extracted onto the guest memory 152, and a data update is trapped by the VMM 140. This embodiment is directed to an example where the HBA 119 is set as the virtualized PCI device 153 because the storage device 120 is set as a target, but this invention can be applied to the virtualized PCI device of another kind such as the NIC 118.

The file server OS 160 is an operating system that operates on the virtual machine 150, includes a driver 161 for a virtualized PCI device, and controls the virtualized PCI device 153 by using the driver 161 for the virtualized PCI device. In this embodiment, the virtualized PCI device 153 is a device obtained by the VMM 140 virtualizing the HBA 119 serving as a physical PCI device.

Further, in response to a trigger of a control completion interrupt received from the block server OS 130 as the virtualized interrupt (or logical interrupt) 197 to the virtualized CPU 151, the file server OS 160 receives the execution result obtained by processing the storage operation command in response to issue of the storage operation command 192 transmitted to the block server OS 130.

In addition, the VMM 140 includes a virtual to physical CPU mapping table 141, and manages a relationship between the virtualized CPU 151 and the physical CPU core B within the physical CPU core group B 114 allocated to the virtual machine 150.

Further, the VMM 140 includes an interrupt routing description table 142, and manages interrupt information on the virtual machine 150. As described later, the interrupt routing description table 142 includes an interrupt information reading area 143 for storing information relating to the virtual and physical resources used by the file server OS 160 and an interrupt information writing area 144 for writing information necessary for the block server OS 130 to use a hardware-assisted interrupt based on the CPU resource 111.

The virtual to physical CPU mapping table 141 and the interrupt routing description table 142 are retained in the memory group B 115b. In particular, the interrupt routing description table 142 is retained in the shared memory area 116 so as to allow access from the block server OS 130.

Further, in booting the physical computer 110, first, the physical CPU core group A 113 loads the block server OS 130 into the memory group A 115a, and the physical CPU core group A 113 boots the block server OS 130. Then, the block server OS 130 loads the VMM 140 into the memory group B 115b, and allocates the physical CPU core group B 114 to the VMM 140 to boot the VMM 140. Then, the VMM 140 allocates a part of the memory group B 115b and a part of the physical CPU core group B 114 to the virtual machine 150, and boots the file server OS 160 with the guest memory 152 and the virtualized CPU 151.

Then, the VMM 140 sets the shared memory area 116, which can be read/written by both the VMM 140 and the block server OS 130, in a part of the memory group B 115b, and locates, in the shared memory area 116, the interrupt routing description table (interrupt routing information) 142 including a correspondence relationship between the physical interrupt and the logical interrupt to the file server OS 160.

Figure 2:
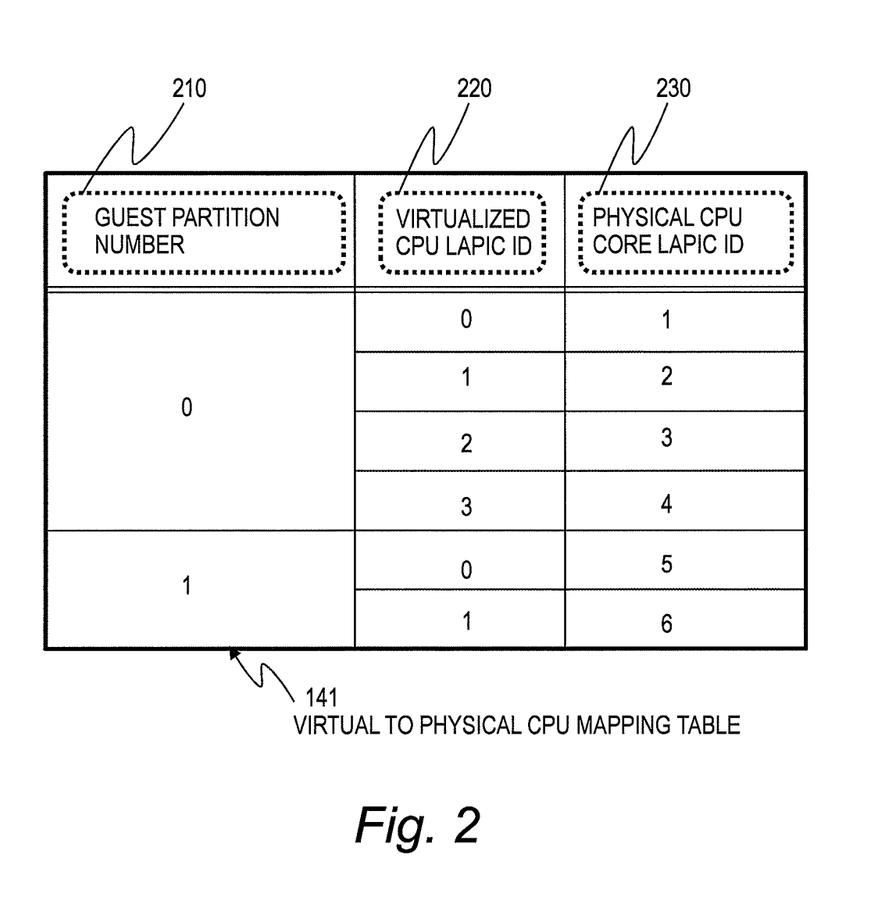
FIG. 2 shows the embodiment of this invention, and is an example of the virtual to physical CPU mapping table.

FIG. 2 shows an example of the virtual to physical CPU mapping table 141 retained by the VMM 140. The virtual to physical CPU mapping table 141 is a part of CPU scheduling information dedicated to an interrupt relationship managed by the VMM 140.

The virtual to physical CPU mapping table 141 includes the guest partition number 210 for storing an identifier of the guest partition 102 in which the file server OS 160 operates, a virtualized CPU LAPIC ID 220 of the virtualized CPU 151 used by the guest partition 102, and a physical CPU core LAPIC ID 230 of the physical CPU core B within the physical CPU core group B 114 allocated to the virtualized CPU 151.

In the shown example, four virtualized CPUs 151, whose LAPIC IDs are "0" to "3", are allocated to the guest partition 102 having the guest partition number 210 of "0" in which the file server OS 160 operates. It is further shown that the physical CPU core B whose LAPIC IDs are "1" to "4" within the physical CPU core group B 114 are allocated to those virtualized CPUs 151. It should be noted that the guest partition number 210 being "1" is a guest partition number that is not shown in FIG. 1.

It should be noted that the physical CPU core LAPIC ID 230 and the virtualized CPU LAPIC ID 220 are values acquired by the VMM 140 at a predetermined timing (by, for example, polling). Further, the physical CPU core LAPIC ID 230 is an identifier of an interrupt management function of the physical CPU core B, and the virtualized CPU LAPIC ID 220 is an identifier of an interrupt management function of the virtualized CPU 151.

Figure 3:
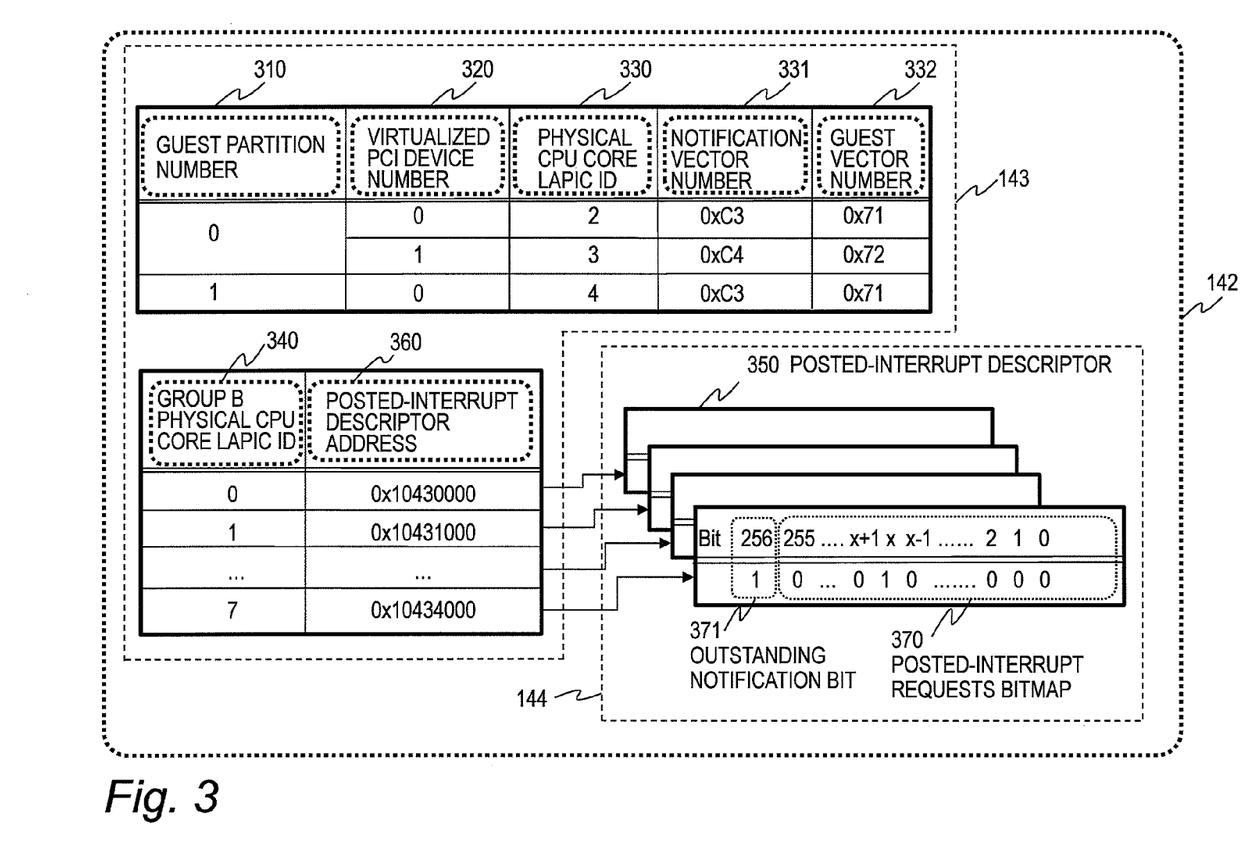
FIG. 3 shows the embodiment of this invention, and is an example of the interrupt routing description table.

FIG. 3 shows an example of the interrupt routing description table 142 retained by the VMM 140 in the shared memory area 116 of the memory group B 115b.

The interrupt routing description table 142 includes the interrupt information reading area 143 and the interrupt information writing area 144. The interrupt information reading area 143 includes a guest partition number 310 for storing the identifier of the guest partition 102 in which the file server OS 160 operates, a virtualized PCI device number 320 for storing an identifier of the virtualized PCI device 153 used by the file server OS 160, a physical CPU core LAPIC ID 330 for storing an identifier of the LAPIC of the physical CPU core B associated with each of virtualized PCI devices, a notification vector number 331, a guest vector number 332, each group B physical CPU core LAPIC ID 340 within the physical CPU core group B 114, a posted-interrupt descriptor (PID) 350 included in each physical CPU core B within the physical CPU core group B 114, and a PID address 360 for storing a memory address at which the PID 350 is retained. It should be noted that the notification vector number 331 and the PID address 360 are as disclosed in pp. 29-13, 14 of Non patent Literature 1 described above, and each take one of values included in the VMCS 145.

The notification vector number 331 is one of the values included in the VMCS 145 as disclosed in pp. 29-13, 14 of Non patent Literature 1 described above, and includes information for causing the virtualized interrupt 197 illustrated in FIG. 1 to the virtualized CPU 151 in the physical CPU core B of a notification destination of the physical interrupt (physical IPI 195).

In a posted interrupt, a notification vector is added to the physical IPI 195, to thereby cause the physical CPU core B, which has received the physical IPI 195, to refer to the PID 350 to add the interrupt vector based on a value of posted-interrupt requests (PIR) bitmap 370 to the virtualized interrupt 197 to the virtualized CPU 151.

The guest vector number 332 is a value conforming to the MSI-X of the above-mentioned PCI standards, which is acquired by the VMM 140 performing hook or the like when the file server OS 160 accesses the virtualized PCI device 153. The value of the guest vector number 156 of the virtualized PCI device 153 illustrated in FIG. 1 is set in the guest vector number 332 by the VMM 140.

Here, an outline of the posted interrupt is the hardware-assisted interrupt virtualization between processors for a virtualized environment mounted to a processor manufactured by Intel Corporation, and the hardware-assisted interrupt virtualization obtained by expanding a virtualization technology for Xeon (VT-x) disclosed in Non patent Literature 1 described above. The posted interrupt is the hardware-assisted interrupt virtualization for the virtualized environment for notifying of an interrupt at high speed without the intermediation of the VMM 140 (virtualization software) when the interrupt is caused from a guest OS to another guest OS in a status in which a plurality of guest OSes are operating on the same virtualization software.

The physical CPU core B, which has received the posted interrupt, activates an interrupt handler of the guest OS (file server OS 160) designated by the guest vector number 332 of the interrupt information reading area 143 with respect to the corresponding virtualized CPU 151.

Accordingly, unlike the related-art example, the physical CPU core B, which has received the physical IPI 195, can activate the interrupt handler of the guest OS (file server OS 160) directly from the virtualized CPU 151 without activating the interrupt handler by the virtualization software (VMM 140), to thereby increase the speed of interrupt processing for the virtualized environment.

Further, the interrupt information writing area 144 is an area for writing information necessary for the IPI management function 132 to use the hardware-assisted interrupt virtualization based on the physical CPU, and includes the PID 350. The PID 350 includes information on the PIR bitmap (hereinafter referred to as "posted-interrupt requests bitmap") 370 and an outstanding notification (ON in FIG. 8) bit 371. It should be noted that a detailed configuration of the PIR (interrupt request) bitmap 370 is as disclosed in pp. 29-13, 14 of Non patent Literature 1 described above.

The posted-interrupt requests bitmap 370 includes an interrupt vector for designating the logical interrupt vector for the file server OS 160. Further, the outstanding notification bit 371 indicates that the physical IPI 195 has been generated, and is set when the physical IPI 195 is generated.

As described above, the interrupt routing description table 142 including the interrupt information reading area 143 and the interrupt information writing area 144 is stored in the shared memory area 116, which can be read/written by both the VMM 140 and the block server OS 130, and stores information relating to the posted interrupt. Further, the block server OS 130 uses the interrupt routing description table 142, to thereby be able to notify the file server OS 160 serving as the guest OS under control of the VMM 140 of an inter-processor interrupt (IPI) directly from the block server OS 130 out of control by the VMM 140.

It should be noted that the guest partition number 310, the virtualized PCI device number 320, the physical CPU core LAPIC ID 330, and the notification vector number 331 are the values set by the VMM 140. Further, the guest vector number 332 is the value set by the guest OS (file server OS 160).

Figure 4:
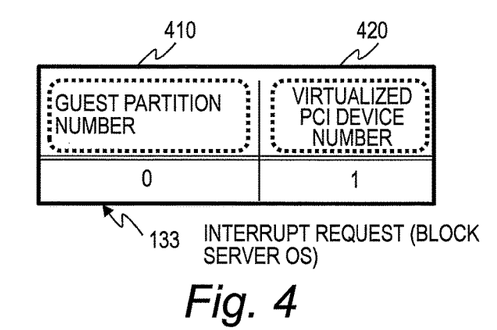
FIG. 4 shows the embodiment of this invention, and is an example of the interrupt request generated by the command processing function of the block server OS.

FIG. 4 shows an example of the interrupt request 133 generated by the command processing function 131 of the block server OS 130. In order to uniquely distinguish which virtualized PCI device corresponds to the command, the interrupt request 133 includes a guest partition number 410 for storing the identifier of the guest partition in which the file server OS 160 is executed and a virtualized PCI device number 420 for storing the identifier of the virtualized PCI device 153 allocated to the file server OS 160.

FIG. 4 shows an example of the interrupt request 133 to the virtualized CPU 151 having the guest partition number of "0" and the virtualized PCI device number of "1".

3. INITIALIZATION AND UPDATE PROCESSING FOR INTERRUPT INFORMATION PERFORMED BY VMM

Next, an example of initialization and update processing for the interrupt routing description table 142 performed by the VMM 140 is described with reference to the following flowchart.

Figure 5:
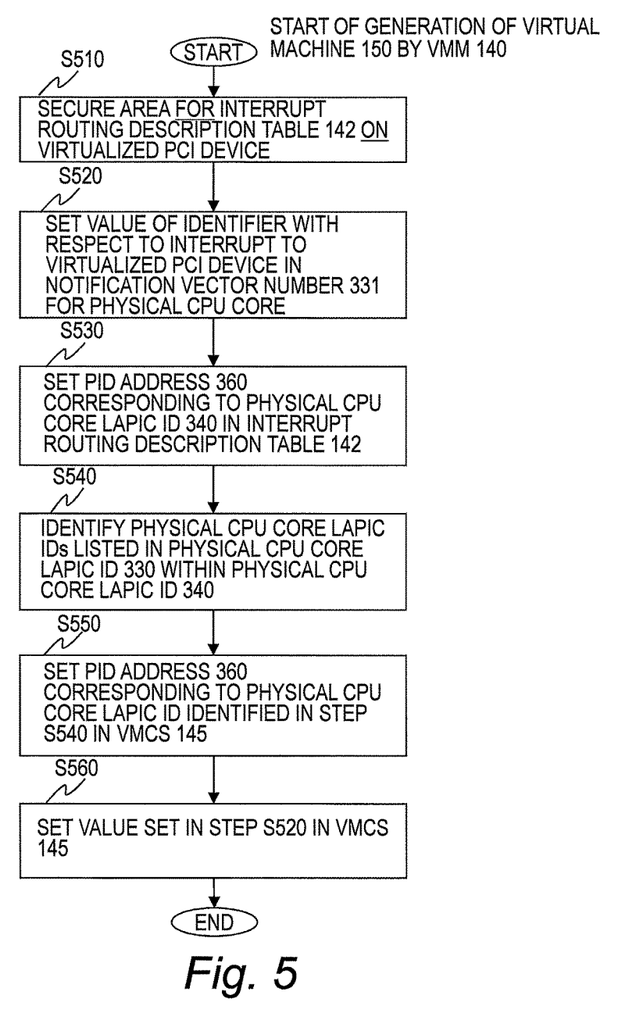
FIG. 5 shows the embodiment of this invention, and is a flowchart illustrating an example of processing for initializing the interrupt routing description table after configuration of the virtualized PCI device.

FIG. 5 is a flowchart illustrating an example of processing for initializing the interrupt routing description table 142 after configuration of the virtualized PCI device 153 which is performed by the VMM 140 when the virtual machine 150 is generated by the VMM 140. The processing is executed when the virtual machine 150 is generated.

The VMM 140 secures data area that can retain the interrupt routing description table 142 in the shared memory area 116 at a time of generation of the virtual machine 150 (S510). In other words, the VMM 140 secures an area for storing the interrupt information reading area 143, the interrupt information writing area 144, and the PID 350, which are shown in FIG. 3, in the shared memory area 116 within the memory group B 115b.

Subsequently, the VMM 140 sets the notification vector number (arbitrary value of the identifier with respect to the interrupt to the virtualized PCI device) of the physical CPU core B within the physical CPU core group B 114 corresponding to the virtualized CPU 151 allocated to the virtual machine 150, in the notification vector number 331 of the interrupt routing description table 142 (S520).

Then, the VMM 140 registers the memory address of the PID 350 corresponding to the group B physical CPU core LAPIC ID 340 within the physical CPU core group B 114 used for the virtualized CPU 151 included in the virtual machine 150, in the PID address 360 (S530).

Subsequently, the VMM 140 identifies physical CPU core LAPIC IDs listed in the physical CPU core LAPIC ID 330 of the interrupt information reading area 143, within the group B physical CPU core LAPIC ID 340 (S540).

After that, the PID address 360 corresponding to the physical CPU core LAPIC ID identified in Step S540 is set in the VMCS 145 (S550).

Finally, the value of the notification vector number set in Step S520 is set in the VMCS 145 (S560).

The VMM 140 carries out the processing of the above-mentioned Step S510 to Step S560 by the number of times corresponding to the number of virtualized PCI devices 153 allocated to the virtual machine 150.

Figure 6:
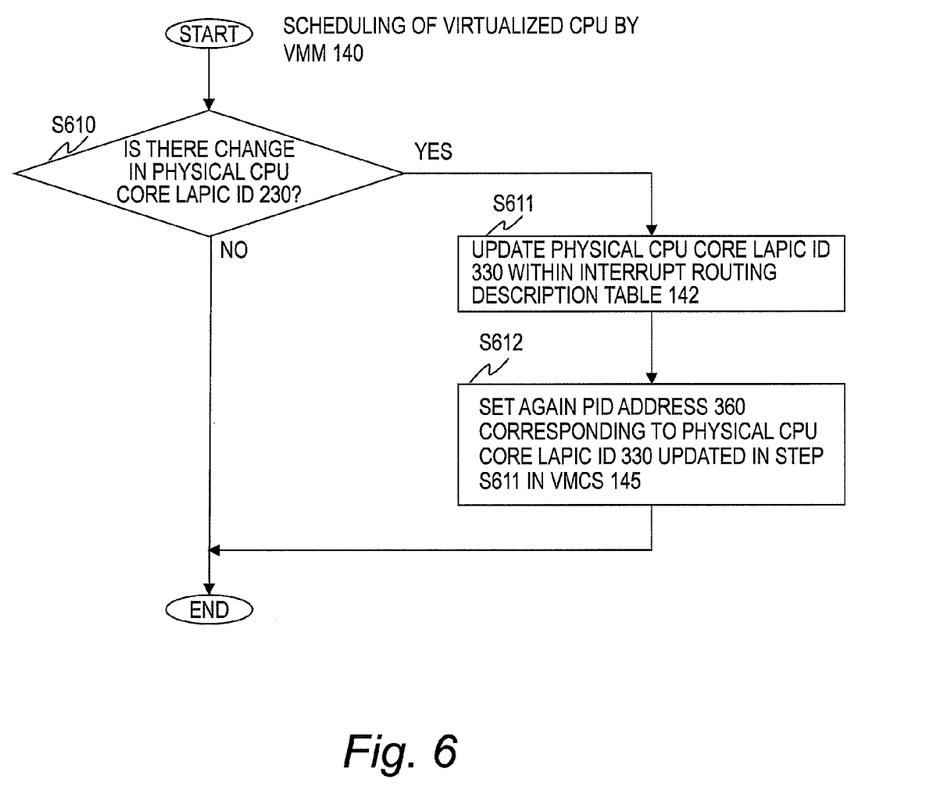
FIG. 6 shows the embodiment of this invention, and is a flowchart illustrating an example of processing for updating the interrupt routing description table which is performed by the VMM.

FIG. 6 is a flowchart illustrating an example of processing for updating the interrupt routing description table 142 which is performed by the VMM 140 when the VMM 140 performs scheduling of the virtualized CPU 151 of the virtual machine 150. The processing is executed when the physical CPU core B allocated to the virtualized CPU 151 is changed. Alternatively, the processing is executed when the VMM 140 performs generation, termination, or the like of the virtual machine 150.

The VMM 140 refers to the virtual to physical CPU mapping table 141 to determine whether or not there is a change in the physical CPU core LAPIC ID 230 corresponding to the virtualized CPU LAPIC ID 220 of the virtual to physical CPU mapping table 141 (S610).

When there is a change, the VMM 140 sets again the changed physical CPU core LAPIC ID 230 in the physical CPU core LAPIC ID 330 within the interrupt information reading area 143 (S611), and sets again the PID address 360 corresponding to the physical CPU core LAPIC ID updated in Step S611, in the VMCS 145 (S612).

By the above-mentioned processing, when there is a change in the physical CPU core LAPIC ID 230 allocated to the virtualized CPU LAPIC ID 220, the VMM 140 updates the values within the interrupt information reading area 143 of the interrupt routing description table 142 and the VMCS 145.

4. PROCESSING PERFORMED BY FILE SERVER OS AT TIME OF CHANGING INTERRUPT INFORMATION

Figure 7:
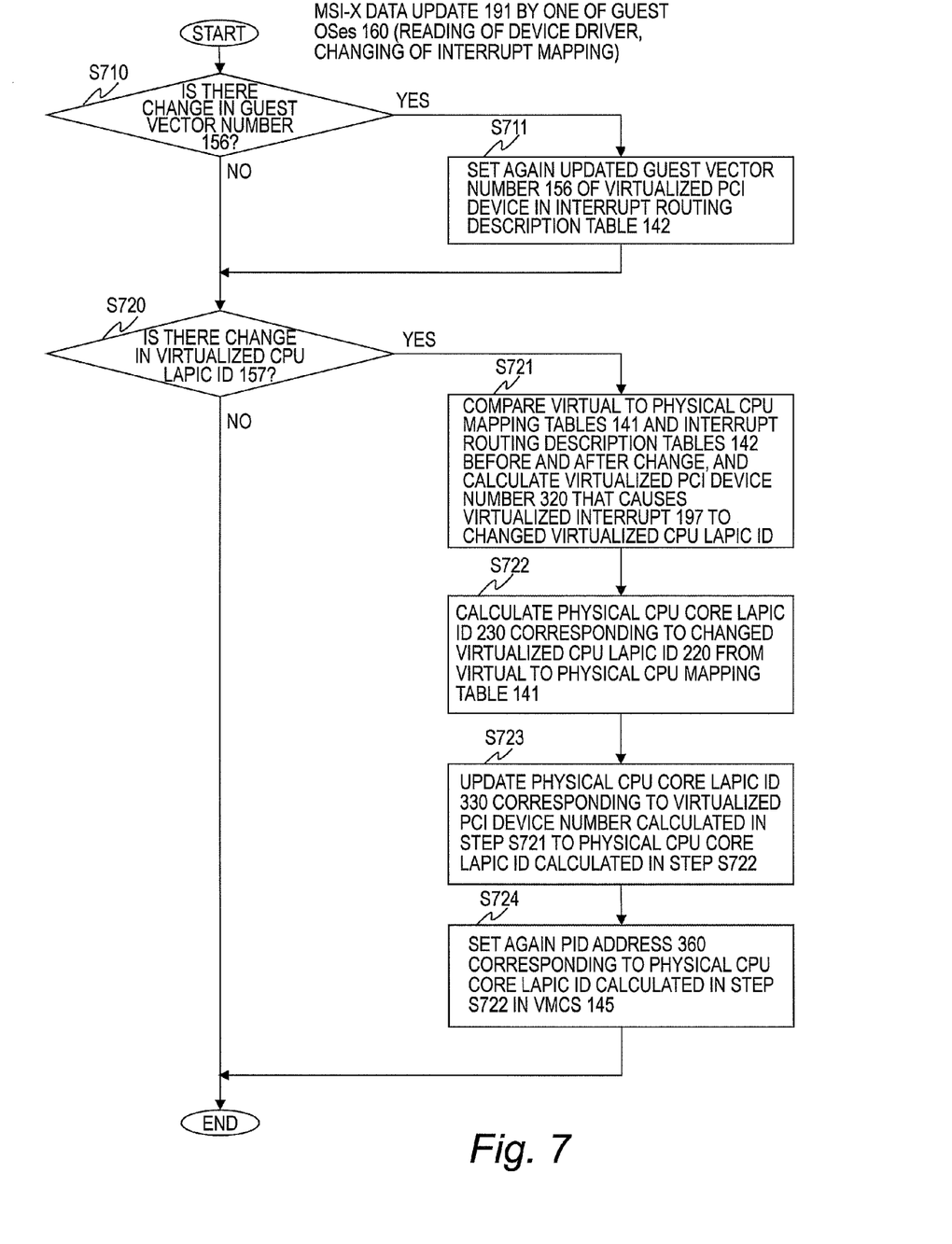
FIG. 7 shows the embodiment of this invention, and is a flowchart illustrating an example of processing for updating the interrupt routing description table which is performed by the VMM.

FIG. 7 is a flowchart illustrating an example of processing for updating the interrupt routing description table 142 which is performed by the VMM 140 based on the boot of the file server OS 160 or a data update 191 of the MSI-X area 155 carried out by the file server OS 160 for the virtualized PCI device 153. This flowchart is carried out by the VMM 140 in response to a trigger of the fact that the VMM 140 has trapped the access made by the file server OS 160 to the MSI-X area 155.

When the data update 191 of the MSI-X area 155 occurs, the VMM 140 compares the guest vector number 332 within the interrupt information reading area 143 with the guest vector number 156 to determine whether or not there is a change in the guest vector number 156 indicating the interrupt vector within the MSI-X area 155 (S710). When there is a change in the guest vector number 156, the procedure advances to Step S711, and the VMM 140 updates the guest vector number 332 in the interrupt information reading area 143 of the interrupt routing description table 142.

Subsequently, the VMM 140 determines whether or not there is a change in virtualized CPU LAPIC ID 157 within the MSI-X area 155 (S720). In this determination, the value of the physical CPU core LAPIC ID 230 corresponding to the virtualized CPU LAPIC ID 157 within the MSI-X area 155 is acquired from the virtual to physical CPU mapping table 141. Then, the VMM 140 determines whether or not the acquired physical CPU core LAPIC ID 230 is equal to the physical CPU core LAPIC ID 330 within the interrupt information reading area 143.

When determining that there is a change in the virtualized CPU LAPIC ID 157, the VMM 140 advances to Step S721. On the other hand, when there is no change, the processing is brought to an end.

When there is a change, the VMM 140 compares the virtual to physical CPU mapping tables 141 and the interrupt routing description tables 142 before and after the change, to calculate the virtualized PCI device number 320 that causes the virtualized interrupt 197 to the changed virtualized CPU LAPIC ID 157 (S721).

Then, the VMM 140 calculates the physical CPU core LAPIC ID 230 corresponding to the changed virtualized CPU LAPIC ID 220 from the virtual to physical CPU mapping table 141 (S722).

After that, the VMM 140 updates the physical CPU core LAPIC ID 330 corresponding to the virtualized PCI device number 320 calculated in Step S721 to the physical CPU core LAPIC ID 230 calculated in Step S722 (S723), and sets again the PID address 360 corresponding to the physical CPU core LAPIC ID 230 calculated in Step S722, in the VMCS 145 (S724).

By the above-mentioned processing, when the data update 191 of the MSI-X area 155 occurs, the VMM 140 reads the virtualized PCI device 153 and the virtual to physical CPU mapping table 141 to update the interrupt routing description table 142 and the VMCS 145 to have the changed values.

5. INTERRUPT OCCURRENCE PROCESSING REQUESTED BY THE COMMAND PROCESSING FUNCTION

Figure 8:
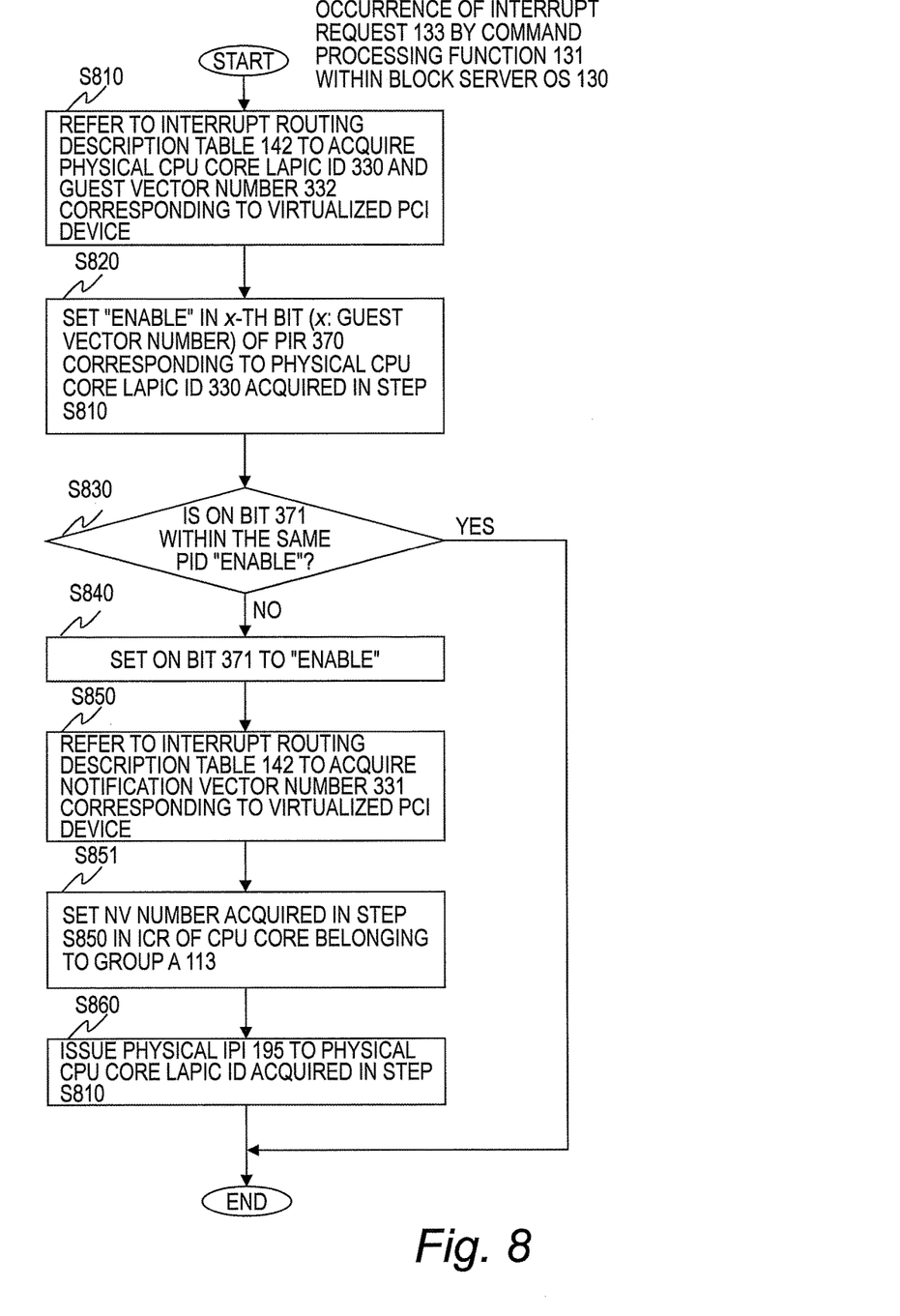
FIG. 8 shows the embodiment of this invention, and is a flowchart illustrating an example of interrupt occurrence processing performed on the block server OS after the interrupt request is issued by the command processing function.

FIG. 8 is a flowchart illustrating an example of interrupt occurrence processing performed on the block server OS 130 after the interrupt request is issued by the command processing function 131.

The IPI management function 132, which has received the interrupt request 133 from the command processing function 131, refers to the interrupt information reading area 143 of the interrupt routing description table 142 within the shared memory area 116, which is set in the shared memory area 116 by the VMM 140, to select such a combination that the guest partition number 410 and the virtualized PCI device number 420 of the interrupt request 133 shown in FIG. 4 match the guest partition number 310 and the virtualized PCI device number 320 in the interrupt information reading area 143 within the shared memory area 116. The IPI management function 132 acquires the physical CPU core LAPIC ID 330 and the guest vector number 332 that correspond to the selected combination of the guest partition number 310 and the virtualized PCI device number 320 (S810).

Subsequently, assuming that the guest vector number 332 acquired in Step S810 has a value of x, the IPI management function 132 sets "enable" (for example, "1") in the x-th bit of the PIR bitmap 370 of the interrupt information writing area 144 corresponding to the physical CPU core LAPIC ID 330 acquired in Step S810 (S820). In other words, the IPI management function 132 reads the physical CPU core LAPIC ID 330 and the guest vector number 332 within the interrupt information reading area 143 set in the shared memory area 116 by the VMM 140, to acquire the PID address 360 corresponding to the group B physical CPU core LAPIC ID 340 shown in FIG. 3. Then, assuming that the value of the guest vector number 332 is set as x among 0 to 255 bits of the PIR bitmap (posted-interrupt requests bitmap) 370 of the PID 350 corresponding to the acquired PID address 360, the IPI management function 132 sets the x-th bit to "enable". With the x-th bit, the virtualized CPU 151 is notified of the interrupt vector.

Subsequently, the IPI management function 132 determines whether or not the outstanding notification (ON in FIG. 8) bit 371 within the interrupt information writing area 144 corresponding to the physical CPU core LAPIC ID 330 acquired in Step S810 is set to "enable" (enabled) (S830).

The outstanding notification bit 371 set to "1" indicates being enabled. At this time point, it is expected that the file server OS 160 be notified of the result of processing the command in response to the issue of the storage operation command 192 that has caused the interrupt request 133, and the IPI management function 132 brings the processing to an end here without processing anything. In other words, the outstanding notification bit 371 set to "enable" indicates that the file server OS 160 has been notified of the interrupt. This can reduce the number of times that the interrupt is processed when a plurality of commands are completed from the block server OS 130, as a result of which the processing for receiving the interrupt on the file server OS 160 is also reduced in frequency, thereby improving throughput.

On the other hand, the outstanding notification bit 371 set to "0" indicates being disabled, and the IPI management function 132 sets the outstanding notification bit 371 to "enable" (for example, 1) (S840). Subsequently, the IPI management function 132 acquires the notification vector number 331 corresponding to the physical CPU core LAPIC ID 330 acquired in Step S810 by searching the interrupt information reading area 143 within the interrupt routing description table 142 (S850).

Subsequently, the IPI management function 132 sets the value of the notification vector number 331 acquired above in Step S850 in an interrupt command register (ICR) (not shown) of the physical CPU core A belonging to the physical CPU core group A 113 (S851).

Subsequently, the IPI management function 132 causes the physical CPU core A, which has the value of the notification vector number 331 set in ICR in Step S850, to issue the physical IPI 195 illustrated in FIG. 1, and sets the physical CPU core LAPIC ID 330 of the interrupt information reading area 143 as a destination of the interrupt (S860).

By the above-mentioned processing of Steps S810 to S860, the physical CPU core B having the physical CPU core LAPIC ID 330 acquired in Step S810 is notified of the physical IPI 195 issued in Step S860.

Subsequently, the physical CPU core B, which has received the physical IPI 195, carries out acquisition 196 of a PID as illustrated in FIG. 1 which involves referring to the PID 350 within the interrupt information writing area 144. In the acquisition 196 of the PID, the physical CPU core B, which has received the physical IPI 195, acquires the guest vector number 332 by reading the posted-interrupt requests bitmap 370 from the PID 350 of the PID address 360 (which has been registered in the VMCS 145) corresponding to the own LAPIC ID (group B physical CPU core LAPIC ID 340).

Then, the physical CPU core B, which has acquired the guest vector number 332, issues the virtualized interrupt 197 accompanying the guest vector number 332 serving as the interrupt vector to the virtualized CPU 151 having the virtualized CPU LAPIC ID 220 corresponding to the physical CPU core LAPIC ID 230 of the virtual to physical CPU mapping table 141.

As described above, when the file server OS 160 issues the storage operation command 192 illustrated in FIG. 1, the virtual machine 150 notifies the block server OS 130 of the storage operation command 192. The block server OS 130 executes the storage operation command 192 with the command processing function 131, to acquire an access result to the storage device 120. In order to return the access result to the file server OS 160, the command processing function 131 issues the interrupt request 133 to the IPI management function 132.

The IPI management function 132 acquires the physical CPU core LAPIC ID 330 corresponding to the virtualized PCI device 153 allocated to the file server OS 160 and the guest vector number 332 corresponding to the interrupt vector. Then, with respect to the PID 350 of the interrupt information writing area 144 of the interrupt routing description table 142 located in the shared memory area 116, the IPI management function 132 sets the value of the guest vector number 332 in the posted-interrupt requests bitmap 370 of the PID 350 corresponding to the physical CPU core LAPIC ID 330.

Subsequently, the IPI management function 132 reads the notification vector (NV) number 331 corresponding to the physical CPU core LAPIC ID 330 from the interrupt information reading area 143, and sets the notification vector (NV) number 331 in the ICR of the physical CPU core A within the physical CPU core group A 113. The physical CPU core A issues the physical IPI 195, and notifies the physical CPU core B within the physical CPU core group B 114 corresponding to the physical CPU core LAPIC ID 330 of the physical IPI 195.

The physical CPU core B acquires the posted-interrupt requests bitmap 370 from the PID 350 corresponding to the physical CPU core LAPIC ID 330 based on the notification vector number 331 included in the physical IPI 195, generates the virtualized interrupt 197 including the interrupt vector based on the value of the posted-interrupt requests bitmap 370, and notifies the virtualized CPU 151 thereof. The file server OS 160 executed by the virtualized CPU 151 activates the interrupt handler corresponding to the interrupt vector to acquire the response from the block server OS 130, and completes a series of processing.

6. CONCLUSION

According to this embodiment, by the above-mentioned components and processing, it is possible to issue the inter-processor interrupt 195 from the physical CPU core A in the virtualization OFF mode for executing the block server OS 130 belonging to the native partition 101, and to realize high-speed interrupt transmission, without software processing of the VMM 140, for the file server OS 160 in the guest partition 102 to which a part of the physical CPU core group B 114 corresponding to the hardware-assisted interrupt virtualization is allocated.

It should be noted that a part or all of the components, processing functions, processing means, and the like of the computer and the like, which are described above in the embodiment of this invention, may be realized by dedicated hardware.

Further, the above-mentioned embodiment is directed to the example of using the multicore CPU, but a physical processor is not limited to a homogeneous processor, and a heterogeneous processor may be used.

Further, various kinds of software exemplified above in this embodiment can be stored in electromagnetic, electronic, optical, and other various recording media (for example, non-transitory storage medium), and can be downloaded onto the computer through a communication network such as the Internet.

Further, this invention is not limited to the above-mentioned embodiment, and various modification examples are included. For example, the above-mentioned embodiment is described in detail for the sake of comprehensive description of this invention, and this invention is not necessarily limited to one that includes all the components that have been described.

What is claimed is:

1. A control method for a computer, the computer comprising:
    a plurality of physical processors comprising hardware-assisted virtualization;
    a memory;
    a first processor group of physical processors having hardware-assisted virtualization set disabled among the plurality of physical processors; and
    a second processor group of physical processors having the hardware-assisted virtualization set enabled among the plurality of physical processors,
  the control method comprising:
    a first step of allocating the first processor group to a first operating system (OS), and booting the first OS;
    a second step of allocating the second processor group to a virtualization part for operating a virtual machine, and activating the virtualization part;
    a third step of allocating, by the virtualization part, a predetermined area within the memory and a predetermined one of the plurality of physical processors within the second processor group to a second OS serving as the virtual machine, and booting the second OS;
    a fourth step of setting, by the virtualization part, a shared area, which is readable/writable by both the first OS and the virtualization part, in the memory;
    a fifth step of setting, by the virtualization part, interrupt routing information comprising a correspondence relationship between a logical interrupt to the second OS and a physical interrupt thereto, in the shared area;
    a sixth step of acquiring, by the first OS, the interrupt routing information from the shared area;
    a seventh step of controlling, by the first OS, a first physical processor within the first processor group to generate the physical interrupt based on the correspondence relationship between the logical interrupt to the second OS and the physical interrupt thereto, which is comprised in the interrupt routing information, and issuing, by the first physical processor, the physical interrupt to a second physical processor within the second processor group based on the interrupt routing information; and
    an eighth step of issuing, by the second physical processor, when receiving the physical interrupt from the first physical processor, the logical interrupt to the second OS based on the interrupt routing information.

2. The control method for a computer according to claim 1, wherein:
  the third step comprises:
    allocating, by the virtualization part, the second physical processor within the second processor group to the second OS as a virtualized processor; and
    setting, by the virtualization part, information on the virtualized processor used by the second OS as a part of virtual machine state information retained by the virtualization part;
  the fifth step comprises setting, by the virtualization part, an identifier of an interrupt management function of a physical processor core corresponding to an identifier of an interrupt management function of the virtualized processor allocated to the second OS of an interrupt reception target and a guest vector for identifying an interrupt handler of the second OS of the interrupt reception target, in the interrupt routing information; and
  the sixth step comprises acquiring, by the first OS, from the interrupt routing information, the identifier of the interrupt management function of the physical processor core corresponding to the identifier of the interrupt management function of the virtualized processor allocated to the second OS of the interrupt reception target and the guest vector for identifying the interrupt handler of the second OS of the interrupt reception target.

3. The control method for a computer according to claim 2, wherein:
the fifth step further comprises setting, by the virtualization part, a notification vector added to the physical interrupt generated by the first physical processor and a posted-interrupt requests bitmap corresponding to the guest vector, in the interrupt routing information; and
the seventh step comprises enabling, by the first OS, an outstanding notification bit indicating that the physical interrupt has been issued, in the interrupt routing information.

4. The control method for a computer according to claim 3, wherein:
the fifth step further comprises setting the notification vector and a memory address of the memory area for retaining the posted-interrupt requests bitmap and the outstanding notification bit, in the virtual machine state information retained by the virtualization part, in order to control the physical processor core corresponding to the identifier of the interrupt management function of the virtualized processor allocated to the second OS to carry out the eighth step; and
the seventh step further comprises:
controlling, by the first OS, the first physical processor to generate the physical interrupt in which the acquired notification vector is set; and
issuing, by the first physical processor, the generated physical interrupt to the second physical processor corresponding to the identifier of the interrupt management function of the physical processor core corresponding to the identifier of the interrupt management function of the virtualized processor allocated to the second OS of the interrupt reception target.

5. The control method for a computer according to claim 3, wherein the plurality of physical processors comprise, as hardware-assisted interrupt virtualization, a function of omitting processing performed by virtualization software at an occurrence of the logical interrupt.

6. The control method for a computer according to claim 1, further comprising:
a ninth step of changing, by the virtualization part, a relationship between the plurality of physical processors within the second processor group and the second OS; and
a tenth step of updating, by the virtualization part, the interrupt routing information comprising the correspondence relationship between the logical interrupt to the second OS and the physical interrupt thereto based on the changed relationship between the plurality of physical processors within the second processor group and the second OS.

7. The control method for a computer according to claim 1, wherein:
the correspondence relationship between the logical interrupt to the second OS and the physical interrupt thereto, which is comprised in the interrupt routing information, comprises:
an identifier of an interrupt management function of a virtualized processor set in a message signal interrupt-X (MSI-X) area by the second OS; and
an identifier of an interrupt management function of a physical processor core corresponding to the identifier of the interrupt management function of the virtualized processor; and the control method further comprises:
locating the MSI-X area in the memory area allocated to the second OS; and
trapping, by the virtualization part, access to the MSI-X area, and detecting a change in the correspondence relationship.

8. A computer, comprising:
a plurality of physical processors comprising hardware-assisted virtualization;
a memory;
a first processor group of physical processors having hardware-assisted virtualization set disabled among the plurality of physical processors;
a second processor group of physical processors having the hardware-assisted virtualization set enabled among the plurality of physical processors;
a first operating system (OS) to which the first processor group is allocated; and
a virtualization part to which the second processor group is allocated, for operating a virtual machine, wherein:
the virtualization part is configured to:
set information on a virtualized processor used by a second OS as a part of virtual machine state information retained by the virtualization part;
allocate a predetermined area within the memory and a predetermined one of the plurality of physical processors within the second processor group to the second OS as the virtualized processor, and boot the second OS to be provided as the virtual machine; and
set a shared area, which is readable/writable by both the first OS and the virtualization part, in the memory, and set interrupt routing information comprising a correspondence relationship between a logical interrupt to the second OS and a physical interrupt thereto, in the shared area;
the first OS is configured to acquire the interrupt routing information from the shared area, and controls a first physical processor within the first processor group to generate the physical interrupt based on the correspondence relationship between the logical interrupt to the second OS and the physical interrupt thereto, which is comprised in the interrupt routing information, and the first physical processor issues the physical interrupt to a second physical processor within the second processor group based on the interrupt routing information; and
the second physical processor is configured to issue, when receiving the physical interrupt from the first physical processor, the logical interrupt to the second OS based on the interrupt routing information.

9. The computer according to claim 8, wherein:
the visualization part is further configured to allocate the second physical processor within the second processor group to the second OS as a virtualized processor, and set an identifier of an interrupt management function of a physical processor core corresponding to an identifier of an interrupt management function of the virtualized processor allocated to the second OS of an interrupt reception target and a guest vector for identifying an interrupt handler of the second OS of the interrupt reception target, in the interrupt routing information; and
the first OS is further configured to acquire, from the interrupt routing information, the identifier of the interrupt management function of the physical processor core corresponding to the identifier of the interrupt management function of the virtualized processor allocated to the second OS of the interrupt reception target and the guest vector for identifying the interrupt handler of the second OS of the interrupt reception target.

10. The computer according to claim 9, wherein:
the virtualization part is further configured to set a notification vector added to the physical interrupt generated by the first physical processor and a posted-interrupt requests bitmap corresponding to the guest vector, in the interrupt routing information; and
the first OS is further configured to enable an outstanding notification bit indicating that the physical interrupt has been issued, in the interrupt routing information.

11. The computer according to claim 10, wherein:
the virtualization part is further configured to set the notification vector and a memory address of the memory area for retaining the posted-interrupt requests bitmap and the outstanding notification bit, in the virtual machine state information retained by the virtualization part;
the first OS is further configured to control the first physical processor to generate the physical interrupt in which the acquired notification vector is set; and
the first physical processor is further configured to issue the generated physical interrupt to the second physical processor corresponding to the identifier of the interrupt management function of the physical processor core corresponding to the identifier of the interrupt management function of the virtualized processor allocated to the second OS of the interrupt reception target.

12. The computer according to claim 10, wherein the plurality of physical processors comprise, as hardware-assisted interrupt virtualization, a function of omitting processing performed by virtualization software at an occurrence of the logical interrupt.

13. The computer according to claim 8, wherein the virtualization part is further configured to change a relationship between the plurality of physical processors within the second processor group and the second OS, and update the interrupt routing information comprising the correspondence relationship between the logical interrupt to the second OS and the physical interrupt thereto based on the changed relationship between the plurality of physical processors within the second processor group and the second OS.

* * * * *